United States Patent [19]

Quinn

[11] Patent Number: 4,843,126
[45] Date of Patent: Jun. 27, 1989

[54] AMINOPLAST CATALYST AND COMPOSITIONS

[75] Inventor: Robert E. Quinn, Cleveland, Ohio

[73] Assignee: The Lubrizol Corporation, Wickliffe, Ohio

[21] Appl. No.: 139,897

[22] Filed: Dec. 30, 1987

[51] Int. Cl.$^4$ ............................................. C08L 61/28
[52] U.S. Cl. .................................... 525/162; 524/166;
524/512; 524/597; 525/163; 525/406; 525/443;
525/495; 525/509; 525/516; 525/518; 525/519;
528/254; 528/259; 428/460; 428/463
[58] Field of Search ................ 528/254; 525/162, 157,
525/495, 497, 163, 516, 518, 509, 519, 406, 443;
502/162, 168; 524/166, 512; 428/460

[56] References Cited

U.S. PATENT DOCUMENTS

| | | | |
|---|---|---|---|
| 3,287,318 | 11/1966 | Gloyer et al. | 260/72 |
| 3,674,701 | 7/1972 | Yockum et al. | 252/182 |
| 3,743,612 | 7/1973 | Vial | 260/2.5 L |
| 3,992,338 | 11/1976 | Noyes | 260/21 |
| 4,246,376 | 1/1981 | Didomenico, Jr. | 525/398 |
| 4,297,448 | 10/1981 | Chang et al. | 525/162 |
| 4,323,660 | 4/1982 | Chattha | 525/161 |
| 4,330,458 | 5/1982 | Spinelli et al. | 524/512 |
| 4,352,842 | 10/1982 | Kooymans et al. | 427/385.5 |
| 4,371,657 | 2/1983 | Chang et al. | 524/512 |
| 4,374,164 | 2/1983 | Blank | 427/385.5 |
| 4,529,665 | 7/1985 | Das et al. | 428/460 |
| 4,591,612 | 5/1986 | Quinn | 524/425 |

OTHER PUBLICATIONS

Techniques to Measure Melamine/Polyol Reactions in a Film, Lazzara J. Coatings Technology, vol. 56, No. 710, Mar., 1984.

Calbo—Effect of Catalyst Structure on the Properties of Coatings Cross-Linked with Hexa (Methoxymethyl) Melamine, Journal of Coatings Technology, vol. 52, No. 660, Jan., 1980, pp. 75-83.

Bauer et al.—Cross-Linking Chemistry and Network Structure in Organic Coatings, J. Polymer Science, vol. 18, 1997-2014 (1980).

Calbo—Catalyst Selection for High Solids Coatings, High Solids Coatings, Sep., 1982, p. 15.

Primary Examiner—Theodore E. Pertilla
Attorney, Agent, or Firm—Forrest L. Collins; Robert A. Franks; Roger Y. K. Hsu

[57] ABSTRACT

Aminoplast compositions are cured using a sulfur and phosphorus containing catalyst.

34 Claims, No Drawings

AMINOPLAST CATALYST AND COMPOSITIONS

BACKGROUND OF THE INVENTION

1. Field of the Invention

This invention describes aminoplast compositions, methods for curing such compositions, catalysts useful in curing the compositions and articles made from the cured aminoplast resin.

2. Introduction to the Invention

This invention describes, in particular, catalysts which are useful for curing aminoplast compositions. A generalized definition of an aminoplast resin as may be used herein is a class of thermosetting resins made by the reaction of an amino compound with an aldehyde to give a substantially sulfur-free resin product. Typically, the aldehyde will be formaldehyde and the most important amino compounds being urea and melamine. These materials and their methods of preparation will be discussed further in the specification.

The aminoplast resins are useful in such diverse areas as molding, adhesives, laminating, textile finishes, permanent-press fabrics, wash and wear apparel fabrics, protective coatings, paper manufacture, leather treatment, binders for fabric, foundry sands, graphite resistors, plaster of paris fortification, foam structures and ion-exchange resins.

As with most chemical compositions, the aminoplast resins may be enhanced in their curing rate through the use of a catalyst. The use of a catalyst is particularly important when the composition is flowable or is a molded composition. In such cases, it is desired that the aminoplast resin be cured quickly to avoid sagging, in the case of a flowable resin, and rapidly when a potted composition is prepared so that the mold may be reused.

A particularly important feature in the curing of an aminoplast resin, particularly in coatings and paints, is that the catalyst employed should not be particularly water-soluble. When the catalyst system is water-soluble, such as when para-toluene sulfonic acid is employed, the coating can deteriorate due to the affinity of the catalyst for water. A further important feature in the selection of a catalyst for an aminoplast coating or paint composition is that the catalyst be of sufficient strength to allow rapid curing at low temperatures. A particularly advantageous aspect of the present invention is low temperature curing with high water tolerance, e.g., the coating lasts longer.

It is known from Gloyer et al in U.S. Pat. No. 3,287,318 issued Nov. 22, 1966 that various metal phosphate salts may be employed in the curing of aldehyde-substituted amide interpolymers. U.S. Pat. No. 4,352,842 to Kooymans et al describes the use of zinc short chain fatty acid salts for the curing of epoxy-derived resins.

U.S. Pat. No. 3,743,612 issued July 3, 1973 to Vial describes zinc ammonium salts for the curing of carboxylated resins. Vial discloses the presence of copolymers in his carboxylated latex as including melamine-formaldehyde condensates, urea, urea-formaldehyde condensates, methylated melamine-formaldehyde condensates, methylated urea-formaldehyde condensates, butylated melamine-formaldehyde condensates, butylated urea-formaldehyde condensates and phenol-formaldehyde condensates.

Noyes, in U.S. Pat. No. 3,992,338, issued Nov. 16, 1976 states that phosphate esters may be employed as curing agents for resins. In particular, Noyes states that small quantities of phosphoric acid may accelerate the cross-linking of the resins employed in this patent. Noyes describes nitrogen containing resins as useful in his composition including those made from an aldehyde and urea, N,N'-ethylene urea, dicyandiamine and aminotriazines, such as melamines and guanamines. It is observed that the phosphoric acid suggested by Noyes for curing various resin systems is a highly water-soluble material.

Chang et al, in U.S. Pat. No. 4,297,448, issued Oct. 27, 1981, describe the use of toluene sulfonic acid or phosphoric esters as being useful for curing thermosetting coating compositions. U.S. Pat. No. 4,371,657 to Chang which issued on Feb. 1, 1983 describes various aminoplast resins which may be employed in coating compositions for the exteriors of trucks and automobiles.

U.S. Pat. No. 4,330,458 issued May 18, 1982 to Spinelli et al describes alkylated melamine formaldehyde cross-linking agents which are cured through the use of an acid catalyst. The compositions of Spinelli et al are stated to be particularly useful as an exterior finish for automobiles, trucks, airplanes and appliances, as well as coil coatings.

Chattha, in U.S. Pat. No. 4,323,660, issued Apr. 6, 1982 describes amine aldehyde cross-linking agents and the reaction product of an epoxy functional polymer containing at least two hydroxyl groups per molecule and a sulfonic acid having a branched or linear alkyl or aryl group thereon.

U.S. Pat. No. 4,374,164 to Blank, issued February 15, 1983 discloses that high solid polymer resin coating compositions cross-linked with an alkylated melamine resin may be obtained. The Blank patent discloses numerous melamine resins which may be used in forming coating compositions.

U.S. Pat. No. 4,529,665 to Das et al discloses ammonium salts of sulfocarboxylic acids for curing active hydrogen-containing resins. Quinn, in U.S. Pat. No. 4,591,612, describes compositions which may be utilized for coatings which contain thixotropic agents.

U.S. Pat. No. 4,246,376, issued Jan. 20, 1981 to Didomenico, Jr., discloses methylolamino compositions which may be cured with high molecular weight fatty diols or higher polyols. U.S. Pat. No. 3,674,701, issued July 4, 1972 to Yochum et al, describes accelerator compositions comprising a thiourea, a poly-sulfide and a tetramethylthiuram disulfide compound and a salt of the formula $((RO)_2P(S)S)_2Zn$ or a zinc salt of the reaction product of ethanolamine, formaldehyde and carbon disulfide.

Various melamine structures and the reactions with polyols are disclosed in *Techniques to Measure Melamine/Polyol Reactions in a Film*, Lazzara J. Coatings Technology, Vol. 56, No. 710, March, 1984.

Further suggested sources for review concerning aminoplast coatings include a paper entitled Effect of Catalyst Structure on the Properties of Coatings Cross-linked with Hexa(methoxymethyl)melamine, by Calbo, Journal of Coatings Technology, Vol 52, No. 660, January, 1980, pp 75–83. The reader is also directed to *Crosslinking Chemistry and Network Structure in Organic Coatings*, J. Polymer Science, Vol. 18, 1997–2014 (1980) by Bauer et al. Bauer further reports his work on coatings in the same journal at Volume 18, 2015–2025.

Calbo has further reported information on coatings in *Catalyst Selection for High Solids Coatings*, Calbo, High Solids Coatings, September, 1982, page 15 et seq. Bauer has further reported his work in network formation and degradation in urethane and melamine-formaldehyde cross-linked coatings in a paper presented at the American Chemical Society spring meeting in 1987 at Denver, Colo. Baker, in February, 1985, presented a paper to the Water-Borne & Higher-Solids Coatings Symposium on the subject of acid catalysts for melamine resins.

It has now been found that through the use of certain sulfur and phosphorus containing molecules that the catalyzed curing of aminoplast resins may be accomplished at low temperatures and while imparting a high degree of water resistance of the cured coating. The aminoplast resins, as later described herein, are cured to a hard, and water stable coating through the use of the technology employed herein.

Throughout the specification and claims, percentages and ratios are by weight, temperatures are in degrees Celsius and pressures are in KPa gauge unless otherwise indicated. Ranges, weights and ratios given herein are exemplary and may be combined if desired. To the extent that references cited herein are applicable to the present invention, they are herein incorporated by reference.

SUMMARY OF THE INVENTION

The present invention describes a curable composition comprising:
 (A) at least one organo substituted thiophosphoric, thiophosphonic or thiophosphinic acid or salt thereof;
 (B) at least one aminoplast composition.

A further embodiment is a curable composition obtained from:
 (A) at least one organo substituted thiophosphoric, thiophosphonic or thiophosphinic acid or salt thereof;
 (B) at least one aminoplast composition; and,
 (C) at least one aminoplast coreactant.

A further embodiment of the invention is a composition comprising:
 (A) at least one organo substituted thiophosphoric, thiophosphonic or thiophosphinic acid or salt thereof;
 (B) at least one aminoplast composition; and,
 (D) at least one overbased alkali metal or alkaline earth metal containing composition.

Yet a further variation of the present invention is a composition comprising:
 (A) at least one organo substituted thiophosphoric, thiophosphonic or thiophosphinic acid or salt thereof;
 (B) at least one aminoplast composition;
 (C) at least one aminoplast co-reactant; and,
 (D) at least one overbased alkali metal or alkaline earth metal containing composition.

The present invention also describes a process for curing the compositions of the present invention through the application of sufficient energy to cure the composition. The present invention also describes articles coated with the above-described compositions and articles molded from the above-described compositions.

DETAILED DESCRIPTION OF THE INVENTION

The present, invention as previously noted, deals with curing aminoplast resins. The first component to be discussed in the curing of the aminoplast resins is the catalyst employed herein.

A. The Organo Substituted Thiophosphoric, Thiophosphonic or Thiophosphinic Compound The catalyst used herein to cure the aminoplast resins is an organo substituted thiophosphoric, thiophosphonic or thiophosphinic acid or salt thereof. Various organo substituted salts of the type previously described are known. The various acids are set out below as shown by their corresponding structural formulas. The notation wherein the sulfur (or oxygen) is shown in the parenthesis indicates a phosphorus-sulfur (oxygen) double bond. Each of the groups, R, are either directly bonded to the phosphorus or are bonded through an intermediate oxygen or sulfur atom. The compounds useful as the organo substituted thiophosphoric, thiophosphonic or thiophosphinic acid or the salts derived from the acids are as follows.

1. Dihydrocarbylphosphinodithioic acids corresponding to the formula, $R(R^1)P(S)SH$ 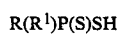

2. S-hydrocarbyl hydrogen hydrocarbylphosphonotrithioacids corresponding to the formula, $R(R^1S)P(S)SH$.
3. O-hydrocarbyl hydrogen, hydrocarbylphosphonodithioacids corresponding to the formula, $R(R^1O)P(S)SH$.
4. S,S-dihydrocarbyl hydrogen phosphorotetra-thioic acids corresponding to the formula, $(RS)(R^1S)P(S)SH$.
5. O,S-dihydrocarbyl hydrogen phosphorotrithioic acids corresponding to the formula, $(RO)(R^1S)P(S)SH$.
6. O,O-dihydrocarbyl hydrogen phosphorodithioic acids, corresponding to the formula, $(RO)(R^1O)P(S)SH$.
7. Dihydrocarbylphosphinomonothioic acids of the formula:

$R(R^1)P(O)SH$ or $R(R^1)P(S)OH$ 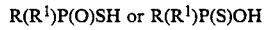

8. S-hydrocarbyl hydrogen hydrocarbyl-phosphonodithioic acids of the formula:

$R(R^1S)P(O)SH$ or $R(R^1S)P(S)OH$ 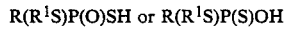

9. O-hydrocarbyl hydrogen hydrocarbylphosphonomonothioic acids of the formula:
$R(R^1O)P(O)SH$ or $R(R^1O)P(S)OH$ 10. S,S-dihydrocarbylphosphorotrithioic acids of the formula:
$(RS)(R^1S)P(O)SH$ or $(RS)(R^1S)P(S)OH$ 11. O,S-dihydrocarbyl hydrogen phosphorodithioic acids of the formula:

$(RO)(R^1S)P(O)SH$ or $(RO)(R^1S)P(S)OH$ 

12. O,O-dihydrocarbyl hydrogen phosphoromono-thioic acids of the formula:

$(RO)(R^1O)P(O)SH$ or $(RO)(R^1O)P(S)OH$ 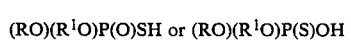

The acid structures shown above describe pentavalent phosphorus molecules. The groups R and $R^1$ are each hydrocarbyl groups. The compounds of structures 7-12 resonate and, thus, the alternative structures are shown.

The organo groups, R and $R^1$, are hydrocarbyl indicating that the compounds may contain atoms other than carbon and hydrogen, provided that any additional moiety in the molecule does not substantially interfere with the catalytic purposes for which the compounds described above are desired. Typically, the organo group is a hydrocarbon (carbon and hydrogen only) moiety.

Typically, the hydrocarbyl groups R and $R^1$ will each contain at least 1 carbon atom up to about 100 carbon atoms each. It is also possible for the hydrocarbyl groups to contain from about 3 to 70 carbon atoms, more preferably 4 to 40 carbon atoms and most preferably from 4 to 30 carbon atoms each. The hydrocarbyl groups may be branched or straight chained (preferably alkyl) or may contain aromatic moieties.

A valuable variety of hydrocarbyl group is that corresponding to the residue of a hydrocarbyl substituted phenyl. In such instances, the hydrocarbyl substituted phenyl may contain a hydrocarbyl group (preferably alkyl) in one or more places on the aromatic moiety provided that the molecule is not so sterically hindered as to not be readily attached to the phosphorus. The hydrocarbyl substitution on the aromatic groups generally corresponds to that shown above. Thus, the aromatic groups may be discounted when looking at the preferred number of carbon atoms useful in the substituent group.

While the acids described above may be used per se, it is more typical that a salt of the acid will be employed. In particular, the salts have been found to be valuable in giving additional benefits above that obtained from the corresponding acid.

The cations of the salts which are useful herein are typically any polyvalent metal cation. Typically, the cations of the salt will be zinc, copper, antimony calcium, iron, cadmium, titanium, tin and mixtures thereof. Amine salts may also be employed such as the triethylamine, ammonia, diethylethanolamine, pyridine and morpholine salts. The salts may also be utilized in mixtures. A particularly preferred salt for use herein is the zinc salt of the various organo substituted thiophosphoric or thiophosphinic acids.

B. THE AMINOPLAST RESIN

The aminoplast resin for which the organo substituted thiophosphoric and thiophosphinic acid or salt is used as a catalyst has been briefly described above. It is first noted that the aminoplast compositions are capable of curing through condensation. Stated otherwise, the aminoplast resins should be handled with sufficient care such that they do not encounter conditions where autocondensation occurs. It is further noted that the aminoplast resin composition may be utilized as the sole curable material in a coating or moldable composition. More often, an aminoplast coreactant, as is later described, will be utilized.

The particular aminoplast compositions (resins) which are useful herein include those materials which are the condensation product of an amino compound with an aldehyde or an aldehyde precursor. The aminoplast resin should be substantially sulfur free (e.g., less than 5% by weight sulfur). Exemplary of these types of materials are the urea-formaldehyde condensates. Other aminoplast resins include condensation products of formaldehyde with substituted melamine, benzoguanamine and substituted benzoguanamines. A further group of aminoplast compositions include alkylated melamine resins. Particularly preferred are methylated melamine-formaldehyde resins such as hexamethoxymethylmelamine. The preferred aminoplast compositions herein are substantially non-volatile as measured by the foil method at 45° C. for 45 minutes.

Some particularly well known aminoplast resins are amino resins sold by American Cyanamid under the trademark CYMEL. In particular, CYMEL 301, CYMEL 303, and CYMEL 1156, all of which are alkylated melamine-formaldehyde resins, are useful herein.

For a further discussion of amine-aldehyde (aminoplast resin compositions), see U.S. Pat. Nos. 2,222,506; 2,226,518; 2,227,223; 2,227,708; 2,322,979; 2,327,984; 2,323,357; 3,326,265; 2,350,894; 2,681,897; 2,853,463; 3,082,184; 3,235,622; 3,269,994; 3,414,635; 3,865,683; 4,083,830; 4,083,892 and 4,137,389, all of which are herein incorporated by reference. Further melamine formaldehyde resins (aminoplast compositions) include CYMEL 350, 370, 373, 380, 1116, 1130 and 1158. Benzoguanamines are sold by American Cyanamid as CYMEL 1123, 1125 and 1134.

Various urea-formaldehyde resins included herein are available from America Cynamid and include Beetle 60, 65, 80 and XB-1050. Partially alkylated melamine resins include CYMEL 235, 270, 280, 243, 245, 248 and 255.

Still further aminoplast compositions herein include guanamides and benzoguanamines; triaminopyrimidine; 2-mercapto-4,6-diaminopyrimidine; 3,5-diaminotriazole; carbamylguanazole; 2,4-diaminothiodiazole; 2-oxo-4,5-diaminoparabanic acid and mixtures thereof.

Further materials which are useful herein include 6-methyl-2,4-diamino-1,3-5-triazineformaldehyde reaction product, N,N'-bis(methoxymethyl)urea and hexabutoxymethylmelamine.

Among the preferred aminoplast resins herein are alkylated melamines having blocking alkyl groups containing from 1 to 4 carbon atoms. Such materials are obtained by reacting the particular aminoplast resin with an alcohol corresponding to the alkyl carbon group, e.g., methanol is a 1 carbon alcohol and butanol is a 4 carbon alcohol. The melamine resins utilized herein as the aminoplast compound may also be monomeric or polymeric.

C. THE AMINOPLAST COREACTANT

Component (C) herein is an aminoplast coreactant. As noted above the aminoplast resin (B) is capable of self condensing and forming a coating or moldable object without a coreactant. However, it is often preferable to include a coreactant in the compositions to provide additional properties in addition to those obtained from the aminoplast resin.

Suitable aminoplast coreactants useful herein include any compound containing two or more hydroxyl groups. Such alcohols are typically termed as polyols. A particularly preferred form of a polyol is an acrylic resin. That is various materials joined through acrylic groups which contain hydroxyl functionalities thereon. Often the hydroxyl functionality is obtained in a material that has a carboxyl functionality. Typically, the aminoplast coreactant is a low viscosity acrylic resin.

Low viscosity acrylic resins used as the coreactant are generally low molecular weight polymers with a high ratio of functionality. Upon reacting with aminoplast resin agents, they form a crosslinked network to yield a film of good physical properties. A suitable number average molecular weight for these acrylic resins ranges from about 500 to about 3500, more preferably, from about 1000 to about 2500. The low viscosity acrylic resins may also bear other functionality capable of reacting with the aminoplast resin. Among the crosslinking functionalities which can be employed are hydroxyl and carboxyl functionalities. Particularly preferred low viscosity resins are low molecular weight acrylic polymers bearing crosslinking functionality, such as hydroxy-terminated polyethers and hydroxy-terminated polyesters.

Preferred low molecular weight acrylic polymers generally contain hydroxyl functionality in the range of about 10 to about 40 percent by weight of the monomers employed to make the acrylic polymer. They also may include up to about 10 percent by weight of carboxyl functionality. The list of suitable hydroxyl functional monomers for preparation of these acrylic polymers is very long and will be apparent to those skilled in the art. The suitable monomers include, but are not limited to, the following esters of acrylic or methacrylic acid and aliphatic alcohols: 2-hydroxyethyl acrylate; 3-chloro-2-hydroxypropyl acrylate; 2-hydroxy-1-methylethyl acrylate; 2-hydroxypropyl acrylate; 3-hydroxypropyl acrylate; 2,3-dihydroxypropyl acrylate; 2-hydroxybutyl acrylate; 4-hydroxybutyl acrylate; diethyleneglycol acrylate; 5-hydroxypentyl acrylate; 6-hydroxyhexyl acrylate; triethylene glycol acrylate; 7-hydroxyheptyl methacrylate; 3-chloro-2-hydroxy-propyl methacrylate; 2-hydroxymethylethyl acrylate; 2-hydroxypropyl methacrylate; 3-hydroxypropyl methacrylate; 2,3-dihydroxypropyl methacrylate; 2-hydroxybutyl methacrylate; 4-hydroxybutyl methacrylate; 3,4-dihydroxybutyl methacrylate; 5-hydroxypentyl methacrylate; 6-hydroxyhexyl methacrylate; 1,3-dimethyl-3-hydroxybutyl methacrylate; 5,6-dihydroxyhexyl meth-acrylate; and 7-hydroxyheptyl methacrylate. Preferred hydroxy functional monomers are 2-hydroxyethyl acrylate, 2-hydroxyethyl methacrylate, hydroxypropyl acrylate and hydroxypropyl methacrylate.

Preferred carboxyl functional monomers for use in the acrylic polymers are acrylic and methacrylic acids.

The remainder of monomers in the acrylic polymers may be chosen from other esters of acrylic and methacrylic acids. Representative of these esters are methyl acrylate; ethyl acrylate; butyl acrylate; 2-ethylhexyl acrylate, hexyl acrylate, cyclohexyl acrylate, methyl methacrylate, ethyl methacrylate, isopropyl methacrylate, butyl methacrylate, hexyl methacrylate, lauryl methacrylate and stearyl methacrylate. These low molecular weight acrylic polymers are generally prepared by free radical polymerization in the presence of organic solvents. This procedure is well known to those skilled in the art.

Hydroxy terminated polyethers also useful as (C) as low viscosity resins have the general structure

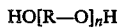

wherein n is between 5 and 50 and R is selected from the group consisting of (1) alkyl groups containing 2 to 12 carbon atoms, (2) cycloalkyl groups containing up to 12 carbon atoms, and (3) aromatic groups. The preferred hydroxy terminated ethers may be prepared in accordance with well known procedures. One such procedure involves reaction of an alkylene oxide or substituted alkylene oxide with a polyol, preferably a saturated, aliphatic or aromatic polyol. Polyols which react with the alkylene oxides or substituted alkylene oxides to form hydroxy terminated polyethers may be selected from aliphatic polyols, aromatic polyols and alicyclic polyols, with saturated aliphatic and aromatic polyols being preferred. Representative of the many polyols for use in preparing the hydroxy terminated polyethers useful in compositions of the invention are: ethylene glycol; propylene glycol; diethylene glycol; glycerol; trimethylol propane; trimethylolethane; 1,2,6-hexane triol, 1,1,3-tris(4-hydroxyphenyl)propane; pentaerythritol; sorbitol; mannitol; dulcitol; diglycerol; etc.

Either alkylene oxides or substituted alkylene oxides may be reacted with the above described polyols to form a hydroxy-terminated polyether. Among the many suitable oxides known in the art are: ethylene oxide; propylene oxide, butylene oxide; pentene oxide; styrene oxide; cyclohexane oxide; 1,4-epoxy cyclohexane oxide; etc.

Exact reaction conditions necessary for forming hydroxy terminated polyethers are well known to those skilled in the art. For a more detailed discussion of suitable polyethers and preparations therefor, attention is directed to *Polyurethanes, Chemistry and Technology*, Volume 1, Saunders and Frisch, Inter-Science Publishers, New York, 1962.

Typical hydroxy-terminated polyesters (C) useful in the invention are low viscosity in nature. In other words, they have a low molecular weight with increased hydroxyl functionality that achieves high crosslinked densities with aminoplast resins, thus, giving satisfactory film properties. Hydroxy-terminated polyesters are normally processed to a low acid number in the range of 3 or less and have a hydroxyl value of 125 or greater. Two techniques for processing these resins are commonly used. One is a fusion process and the other is a solvent process. In both processes, glycol or mixed glycols and dicarboxylic acids or mixed dicarboxylic acids are charged into a reactor and then heated with stirring to remove water. The reaction is forced to completion by heat and reduced pressure until the acidity and water content are low and the hydroxyl number is in the desired range. Catalysts such as acids (e.g., p-toluenesulfonic acid) or metal oxides (e.g., lead oxide, dibutyl tin oxide) may be used to shorten the reaction time. Polyols used for preparation of hydroxy terminated polyesters may be selected from ethylene glycol, propylene glycol, diethylene glycol, glycerol, trimethylol propane, trimethylol ethane, 1,2,6-hexanetriol, 1,1,3-tri(4-hydroxyphenyl)propane, pentaerythritol. Representative of carboxylic acids which may be employed are terephthalic acid; adipic acid, azelaic acid, o-phthalic acid, 1,2-cyclohexanedicarboxylic acid, 1,4-cyclohexanedicarboxylic acid, etc. Carboxylic acid anhydrides, which may be anhydrides of the above enumerated types of carboxylic acids, may also be employed. For example, suitable anhydrides may include succinic anhydride, hexa-hydrophthalic anhydride, phthalic anhydride, trimellitic anhydride, pyromellitic dianhydride, chlorendic anhydride, etc. Also useful herein are phenol formaldehyde resins (C).

Further useful aminoplast co-reactants include those described in U.S. Pat. No. 4,591,612 issued to Quinn on May 27, 1986, which is herein specifically incorporated by reference. A further disclosure of useful polyols is described in U.S. Pat. No. 4,246,376 issued Jan. 20, 1981 to Didomenico which is herein specifically incorporated by reference.

D. THE OVERBASED ALKALI METAL OR ALKALINE EARTH METAL CONTAINING COMPOSITION

It is often useful, particularly in coatings, to incorporate a thixotropic agent into the compositions of the present invention. The thixotropic agent is typically an overbased material (preferably calcium salts) such that the coating as further described herein will resist sagging. The reader is advised to review U.S. Pat. No. 4,591,612, particularly columns 3 through 19 for a disclosure of materials which are suitable alkali metal or alkaline earth metal overbased compositions for use herein. The text of the above-described patent is herein specifically incorporated by reference.

AMOUNT OF REACTANTS

The amount of the organo substituted thiophosphoric, thiophosphonic or thiophosphinic acid or salt thereof, is typically a catalytic amount used with the amino-plast composition. Thus, the amount of the organo substituted thiophosphoric, thiophosphonic or thiophosphinic acid or salt thereof is simply in an amount sufficient to cause a reaction of the aminoplast composition to either self condense or to further react with an aminoplast co-reactant. The amount employed of the organo substituted thiophosphoric, thiophosphonic or thiophosphinic acid or salt thereof will depend upon the temperature during the cure and the amount of time in which the cure is allotted. There is essentially no upper limit on the amount which may be utilized as a catalyst, however, practicality and cost as well as not desiring adverse effects on a coating or potted material will generally suggest that no more than about 15% by weight of the acid or salt should be utilized to cure the aminoplast composition. A preferable range for the amount of the acid or salt utilized is typically from about 0.05% to about 10%, preferably 0.25% to about 2% by weight of the total composition.

The amount of the aminoplast composition (B) in relation to the aminoplast co-reactant (C), when present, is typically in a weight ratio of from about 25:1 to about 1:25, more preferably about 20:1 to about 1:20 and most preferably from about 10:1 to about 1:10. Usually a slight equivalent excess of the aminoplast coreactant is employed.

The amount of the overbased alkali metal or alkaline earth metal containing composition (D), when present, employed herein is usually in a weight ratio to the aminoplast composition (B) at about 1:40 to about 1:10 preferably about 1:30 to about 1:12.

PROCESSING

The components of the present invention are typically combined in any convenient fashion and in any order at a convenient temperature. Component (D), the overbased alkali metal or alkaline earth metal containing composition, may also be included with components (A), (B) and (C). As component (D) is not essential to the composition, its inclusion is simply in an amount, and on an as needed basis. Component (D) is employed when the remaining components are of sufficiently low viscosity that they would otherwise run off or gather at various points on the article to be coated.

The components of the present invention are typically combined at a temperature of about 0° C. to about 40° C., preferably about 5° C. to about 35° C. Any convenient vessel may be utilized to combine the various components of the present invention.

USAGE

The composition of the present invention are typically used to coat articles such as prepared (precoated) cold-rolled steel. Typically, a film of all of the curable composition as premixed, as described above, is applied on the primed cold-rolled steel. A film of about 0.5 to 2.0 mil (12–50 microns dry film) is usually obtained.

Typically, the film will be baked (curing) for a period of time of about 20 seconds to 1 hour at about 60° C. to about 500° C., preferably about 70° C. to about 450° C., most preferably about 80° C. to about 420° C.

The compositions of the present invention may also be utilized to form potted or molded articles. In such situations, it is typical to use component (C) which will highly crosslink with component (B). Typically, the above ranges for curing a film are exceeded on average by 25° C. in order to obtain a molded article. Any suitable mold may be employed to obtain the potted or molded article.

Any other typical ingredients for a film or a molded or potted article may be included as desired to enhance the compositions of the present invention. Such materials include pigments, dyes, light stabilizers, lubricants, mold release agents and the like.

The following is an example of the present invention.

EXAMPLE I

A baking enamel is prepared by combining 1000 parts of Acryloid At-400 (75% solids acrylic polyol in methylamylketone); Cymel 1158 (a melamine resin) at 525 parts (80% solids in n-butanol); n-butanol at 250 parts (solvent); and methyl amyl ketone at 225 parts (solvent). The above composition is mixed with 100 grams of zinc di(4-methyl-2-pentyl) dithiophosphate (50% solids in xylene). This composition is combined with optional ingredients such as U.V. stabilizer, pigments, wetting and dispersing aids and flow modifiers. The resulting mixture is applied to an electrocoated steel substrate at a finished coating thickness of 1.5 mils (37 microns) and baked at 90° C. for 20 minutes.

A further modification of the above is to include in the composition 47 parts (40% solids in xylene) of the thioxtropic agent of Example III of U.S. Pat. No. 4,591,612.

What is claimed is:

1. A curable composition comprising:
    (A) at least one organo substituted thiophosphoric, thiophosphonic or thiophosphinic acid or salt thereof; and,
    (B) at least one aminoplast composition.

2. The composition of claim 1 wherein (A) is a diaryl dithiophosphate.

3. The composition of claim 1 wherein the aminoplast composition is an alkylolamino compound.

4. The composition of claim 1 where (A) is a dialkyl thiophosphate or thiophosphinate salt.

5. The composition of claim 2 wherein the diaryl dithiophosphate contains an alkyl substituent on at least one of the aryl groups.

6. The composition of claim 4 wherein the dialkyl thiophosphate is a dithiophosphate which contains from about 1 to about 100 carbon atoms in each of the alkyl groups.

7. The composition of claim 1 wherein (A) is selected from the group consisting of zinc, copper, antimony, calcium, iron, cadmium, titanium, tin, amine salts and mixtures thereof.

8. The composition of claim 1 wherein the aminoplast composition is a melamine-formaldehyde resin.

9. A composition comprising:
 (A) at least one organo substituted thiophosphoric, thiophosphonic acid or thiophosphinic acid or salt thereof;
 (B) at least one aminoplast composition; and,
 (C) at least one aminoplast coreactant.

10. The composition of claim 9 wherein (A) is a dithiophosphate.

11. The composition of claim 10 wherein the cation of the salt is selected from the group consisting of zinc, copper, antimony, calcium, iron, cadmium, titanium, tin, amine and mixtures thereof.

12. The composition of claim 10 wherein (A) is a diaryl dithiophosphate.

13. The composition of claim 10 wherein the dithiophosphate is a dialkyl dithiophosphate which contains from about 1 to about 100 carbon atoms in each of the alkyl groups.

14. A composition comprising:
 (A) at least one organo substituted thiophosphoric, thiophosphonic or thiophosphinic acid or salt thereof;
 (B) at least one aminoplast composition; and,
 (D) at least one overbased alkali metal or alkaline earth metal containing composition.

15. The composition of claim 14 wherein (A) is a dialkyl thiophosphate, thiophosphonic or thiophosphinate.

16. The composition of claim 14 wherein (A) is a diaryl dithiophosphate.

17. A composition comprising:
 (A) at least one organo substituted thiophosphoric, thiophosphonic or thiophosphinic acid or salt thereof;
 (B) at least one aminoplast composition;
 (C) at least one aminoplast coreactant; and,
 (D) at least one overbased alkali metal or alkaline earth metal containing composition.

18. The composition of claim 17 wherein (A) is a dithiophosphate.

19. The composition of claim 17 wherein the aminoplast coreactant (C) is a polyol.

20. The composition of claim 17 wherein the cation of the salt is selected from the group consisting of zinc, copper, antimony, calcium, iron, cadmium, titanium, tin, amine and mixtures thereof.

21. The composition of claim 17 wherein the aminoplast coreactant is a phenol formaldehyde resin.

22. The composition of claim 17 wherein the dithiophosphate is a diaryl dithiophosphate.

23. The composition of claim 18 wherein the dithiophosphate is a dialkyl dithiophosphate which contains from about 1 to about 100 carbon atoms in each of the alkyl groups.

24. The composition of claim 17 wherein the overbased alkali metal or alkaline earth metal containing composition is a calcium salt.

25. The composition of claim 22 wherein the diaryl dithiophosphate contains an alkyl substituent on at least one of the aryl groups.

26. The composition of claim 17 wherein (A) is the zinc salt.

27. The composition of claim 17 wherein the aminoplast composition is an alkylolamino compound.

28. The composition of claim 19 wherein the coreactant (C) is an acrylic resin.

29. The composition of claim 17 wherein (A) is the amine salt.

30. A process for curing a composition including the steps of obtaining:
 (A) at least one organo substituted thiophosphoric, thiophosphonic or thiophosphinic acid or salt thereof; and,
 (B) at least one aminoplast composition; and applying sufficient energy to cure a mixture of (A) and (B).

31. The process of claim 30 additionally containing at least one aminoplast coreactant.

32. The process of claim 30 additionally containing at least one overbased alkali metal or alkaline earth metal containing composition.

33. A molded article made from the curable composition of claim 1.

34. An article coated with the cured composition of claim 1.

* * * * *